3,725,075
METHOD OF RECOVERING PROTEINS FROM
MICROBIAL CELLS
Tadashi Muroi, Yoshitaka Oguri, and Masahiko Ishida, Hitachi, Japan, assignors to Hitachi, Ltd., Tokyo, Japan
Filed Oct. 28, 1971, Ser. No. 193,490
Claims priority, application Japan, Oct. 28, 1970, 45/94,348
Int. Cl. A23j 1/00, 1/18
U.S. Cl. 99—14                                                  14 Claims

ABSTRACT OF THE DISCLOSURE

A method of recovering proteins from microbial cells which comprises preparing an extract containing proteins and separating the proteins by isoelectric point precipitation from the extract, said isoelectric point precipitation being performed in the presence of a water soluble salt selected from the group consisting of alkali metal salts and ammonium salts in such an amount that the ionic strength of the salt ranges between 0.002 and 0.2 whereby precipitates of proteins aggregate to grow in size and the precipitates can be separated easily to increase a yield of protein recovery.

BACKGROUND OF THE INVENTION

This invention relates to a method of recovering proteins from microbial cells and, more particularly, to a method of recovering proteins contained in microbial cells which includes a step of isoelectric point precipitation of protein that is capable of significantly increasing the yield of protein.

The proteins contained in microbial cells have much higher nutritive value than vegetable proteins and these proteins are remarkably valuable. It is well known that proteins from microbial cells have been used as a protein source for human beings. A certain kind of microbial cells, e.g. petroleum hydrocarbon assimilating microbial cells, have been partly utilized for foodstuffs and fishbaits etc. When the proteins from microbial cells are indirectly used for feedstuffs and fishbaits, the degree of utilization of the proteins is not satisfactory.

Upon consideration of the degree of utilization of proteins from microbial cells, it is preferable to directly supply these proteins as food to humans. Microbial cells, however, have a hard cell wall which is difficult to digest and have a peculiar odor so that it is quite difficult to directly utilize the microbial cells as food for humans.

In order to utilize the microbial cells as a protein source, it is very important to extract and separate highly purified proteins from the microbial cells. Proteins are contained in microbial cells as a mixture comprising different kinds of proteins each having different physico-chemical properties, even between the same strains. In contrast, almost all of the vegetable proteins in soy beans and milk proteins comprise proteins having same or similar physico-chemical properties. Therefore, it is not easy to recover the proteins in high yield from microbial cells as compared with the case of recovery of vegetable proteins and milk proteins. To increase the degree of utilization of microbial cells it is important to raise the yield of recovery and, at the same time, it is also important to produce highly purified proteins to provide a direct food supply for humans.

The present inventors have proved that an isoelectric point precipitation process is most suitable for separating proteins from an extract containing protein prepared by conventional methods. According to the isoelectric point precipitation procedure which has been well known and utilized in the art, it has been found that substantially all of the proteins dissolved in the extract obtained from the microbial cell can be precipitated even though respective proteins have considerably different physico-chemical properties. After many experiments conducted by the present inventors a considerably important disadvantage was found; namely precipitates of proteins are too small in size to efficiently separate the precipitates from the suspension by decantation or lower speed centrifugation so that the actual yield of recovery is lowered.

In order to increase the yield of recovery the present inventors made a great number of investigations, and as a result they found that the protein precipitates aggregate to grow in size when the isoelectric point precipitation procedure is performed in the presence of a suitable amount of an electrolyte, and that the resulting precipitates can be separated easily from the supernatant to increase the yield of recovery.

SUMMARY OF THE INVENTION

It is an object of the present invention to provide a method of recovering proteins from microbial cells which is able to improve the yield of protein.

It is another object to provide a method of recovering proteins which comprises an improved isoelectric point precipitation process to enable separation of proteins in high yield.

It is still another object to provide a method of recovering proteins which is able to produce highly purified proteins in high yield from microbial cells.

It is still further another object to provide a method of recovering proteins which can be carried out productively and efficiently.

The above objects and other objects and features of the present invention will be apparent from the following detailed description taken in conjunction with the accompanying drawings.

Advantageously, the present invention provides a method of recovering proteins from microbial cells which comprises preparing an extract containing the protein found in the microbial cells and effecting isoelectric point precipitation of the proteins from said extract in the presence of a water soluble salt selected from the group consisting of alkali metal salts and ammonium salts, said salt being present in such an amount that an ionic strength ranging between about 0.002 and about 0.2 is produced by dissolving the salt in the extract containing proteins.

DETAILED DESCRIPTION OF THE PREFERRED EMBODIMENTS

Figure 1:
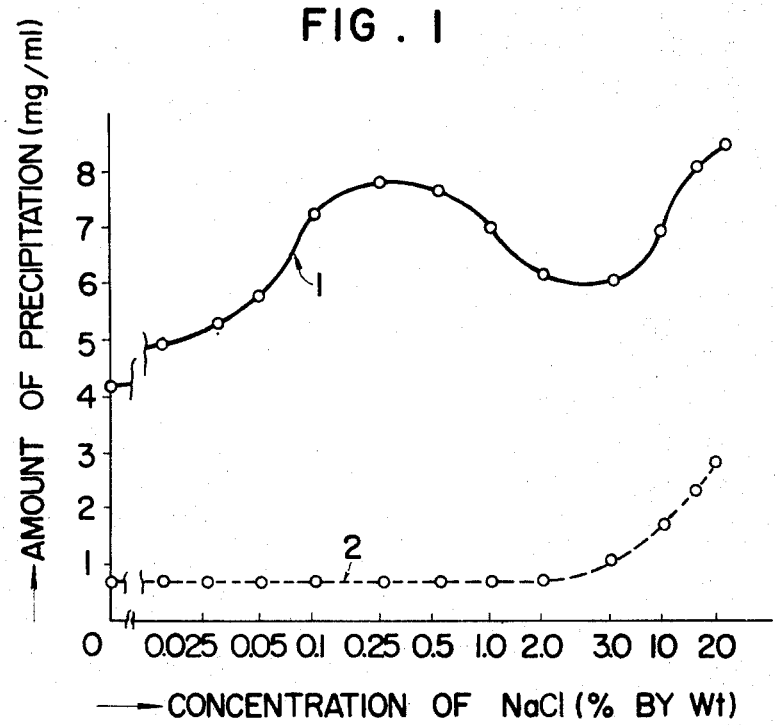
FIGS. 1 through 3 are graphs showing the relations between the amounts of precipitation of proteins and polysaccharides and the concentrations of the water soluble salts used in the method of this invention.

Isoelectric point precipitation of proteins is an excellent method for separating proteins from the extract, but there are such cases that adjustment of pH is quite difficult because proteins extracted from some kinds of microbial cells have a narrow range of optimum pH value at the time of isoelectric point precipitation. For example, when hydrochloric acid is added little by little to a neutral extract to adjust the pH value, the quantity of proteins precipitated increases, but after a certain pH value the quantity decreases. The present inventors discovered that by adding a proper amount of a water soluble salt to an extract the quantity of precipitates could be remarkably increased even when the pH value of the extract is not at the optimum value. It was an unpredictable result that the precipitates aggregated to grow in size so that separation of the precipitates could be done effectively and thereby increase the yield of protein recovery.

Usually, the protein-containing extract is subjected to desalting and removal of low molecular weight substances in order to purify the proteins. By this process the amounts of contaminations, such as, salts and low molecular weight substances, are reduced as low as possible, otherwise the resulting proteins have peculiar odor and color and poor digestability. In the usual preciptation process the quantity of salt in proteins is almost 0.001% by weight. According to the inventors' investigations it was found that precipitation of proteins is promoted by performing the isoelectric point precipitation in the presence of a proper and controlled amount of a water soluble salt.

The water soluble salt suitable for purposes of this invention is selected from the group consisting of alkali metal salts, such as, sodium chloride, sodium sulfate, sodium nitrate or potassium citrate, and ammonium salts, such as, ammonium sulfate, ammonium nitrate, ammonium acetate, ammonium citrate or ammonium oxalate. Concentration of the sale in the protein-containing extract ranges between 0.002 to 0.2 in an ionic strength $\mu$, which is expressed by the following equation:

$$\mu = \frac{1}{2} \, C_i Z_i^2 = \frac{1}{2} (C_1 Z_1^2 + C_2 Z_2^2 + \ldots + C_n Z_n^2)$$

where C is an ionic concentration (gram-ions/liter) and Z is an ionic valence of the salt ions.

The water soluble salt is not used as a precipitating agent. In the conventional precipitation methods, precipitating agents, such as, trichloroacetate, metaphosphoric acid, copper salt, alcohol or actone are added to the protein-containing extract, but the resulting proteins are not preferable because the proteins precipitated contain poisonous substances such as the precipitating agents. Especially, in case of copper salts or other heavy metal salts, such as, calcium salts or barium salts which form insoluble compounds, it is very difficult or impossible to separate heavy metal ions from the proteins. The mechanism of precipitation using the heavy metal salts is completely different from that of the salts employed in the present invention since in the former the precipitation is effected by forming insoluble compounds of the proteins.

In the separation of proteins by the salting-out method, the amount of salt is far larger than that of the present invention. That is, in the salting-out method the salt which is used for effecting dehydration must be added in an amount enough to lower the solubility of the proteins. On the other hand, in the present invention the amount of the salt used is much smaller than that of salting-out method. Though the effect of such a small amount of salt has not been made clear by the inventors, they believe that the precipitation of proteins at the isoelectric precipitation is promoted by change of the charge state of the proteins in the extract containing the electrolyte.

It is essential for performing the specific isoelectric point precipitation to adjust the concentration of the salt in an extract to be subjected to the isoelectric point precipitation. There can be employed various methods of preparing the extract containing the proper amount of salt. For example, a proper amount of salt is added to the extract which has been subjected to the step of desalting and removal of low molecular weight substances. The additive amount is preferably determined in consideration of the residual amount of salt in the extract, but the residual amount is usually made very small in order to purify the proteins, and, therefore, the additive amount may be determined by neglecting the residual amount in almost every case.

According to the investigations of the present inventors, it has proved particularly practical and productive to insure that a proper amount of salt or salt forming substances, i.e. alkali or acid, used for extraction of microbial cells is left in the extract. For example, when microbial cells are extracted with an alkali solution, such as, sodium hydroxide, and the resulting protein-containing extract is neutralized with hydrochloric acid, sodium chloride is formed in the extract. The neutralized extract is then subjected to desalting and removal of low molecular weight substances, but this process is finished in such a manner and at the time when a proper amount of salt remains in the extract. According to this method, the desalting and removal of low molecular weight substances which takes a long period of time can be performed productively and efficiently. The desalting is finished at the time when about 0.002 to 0.1% by weight of the salt remains.

When a neutral salt such as sodium chloride or sodium sulfate is added to the extract after desalting, the salt can be added before or after the pH adjustment since there is no change of pH value. On the contrary, when the salt is not a neutral salt, it is added before the pH adjustment in order to avoid the change of pH value.

The proper amount of the salt can be formed at the time of isoelectric point precipitation in such a manner that removal of alkali or acid from an extract is finished at the time when a proper amount of alkali or acid remains. The remaining alkali or acid forms a salt by adding, at the time of isoelectric point precipitation, acid or alkali respectively to the extract. Alkali extraction is most preferable to obtain a high protein extraction rate; the concentration of alkali to be left in the extract preferably ranges between about 0.003 and 0.09 N. The removal of alkali or acid is carried out, for example, by dialysis or by using an ion exchange resin.

It will be recognized that the essential feature of the present invention resides in the specific isoelectric point precipitation procedure used. Accordingly, the other processes or procedures necessary for performing the overall method of recovering proteins from microbial cells will not be described in detail in this specification for simplicity. These processes or procedures are described in the earlier application Ser. No. 181,055 titled "Process for Separating and Purifying Microbial Cellular Protein," filed Sept. 16, 1971.

The microbial cells can be pretreated prior to the extraction treatment with an acidic solution, such as hydrochloric acid, to improve the efficiency of the extraction.

As well known, extraction is performed by means of various agents such as an alkali solution or an acidic solution or urea solution. Solutions of alkalies which can be used include sodium hydroxide, sodium carbonate, potassium hydroxide, ammonium hydroxide, monomethylamine or dimethylamine. Concentrations on the order of 2 to 6% by weight may be utilized. As acids, mention may be made of sulfuric, hydrochloric, citric and the like. Extraction using mechanical force, such as, sonic or ultrasonic wave devices, can also be utilized.

Insoluble substances produced by rupture of a cell wall during extraction are precipitated and are removed in a suitable manner, such as, centrifugation or filteration. The resulting extract contains useful proteins and low molecular weight substances and an extracting agent.

The extract is subjected to removal of low molecular weight substances and extracting agent when the isoelectric point precipitation is performed without desalting, as previously mentioned.

On the other hand, when the extract is neutralized and subjected to desalting, the salt is removed or reduced to a proper amount by a suitable manner, such as, by gel filteration or by dialysis.

The extraction which contains a proper amount of salt or alkali or acid is subjected to the isoelectric precipitation. The pH value of the extract is adjusted to the isoelectric point of the protein ranging between pH 3 to 5 by acid or alkali. A supernatant of the extract in which proteins are precipitated is removed by decantation or filteration. The resulting proteins are then washed with water. Washing may include suspending the proteins in water. Washed proteins are dried to produce a powder of highly purified proteins.

The present invention is applicable to microbial cells including yeasts, fungi, algae, bacteria and protozoa. Preferable yeasts, which assimilate natural gas, paraffins, aromatic hydrocarbons and other hydrocarbons, are genus Candida, genus Torulopsis and bacteria belonging to genus Pseudomonas, genus Bacillus, genus Metanomonas and genus Micrococcus. Other usable yeasts, such as genus Sacchacomyces propagate in sugars, organic acids, alcohols or other non-hydrocarbon compounds. Bacteria such as genus Bacillus and genus Escherchia are also usable. Algae such as chlorella and protozoa such as paramecium are employed in the present invention. Either wet or dry cells can likewise be employed.

Sufficient effects of the salts may not be expected when the ionic strength is smaller than 0.002. Similarly, when the ionic strength exceeds 0.2, the quantity of proteins precipitated decreases at the beginning, and increases later at the same time an amount of precipitation of polysaccharides increases to lower the purity of proteins. These facts will be understood from FIGS. 1 and 2 of the accompanying drawings showing relations of precipitation amounts and the concentration of sodium chloride.

In FIG. 1, curve 1 shows the amount of proteins from a microorganism precipitated by an isoelectric point precipitation at the optimum pH value (4.0). Curve 2 shows the amount of polysaccharides. The extract subjected to the isoelectric point precipitation was prepared by extracting Torulopsis sp. with sodium hydroxide. It will be understood from the results shown in FIG. 1 that the amount of proteins precipitated can be increased without increasing the amount of polysaccharides when the isoelectric point precipitation is performed in the presence of a proper amount of sodium chloride. When an amount of sodium chloride is larger than about 0.002 by ionic strength (0.02% by weight), the amount of precipitation increases with the amount of sodium chloride. It will be understood from the results shown in FIG. 1 that the amount of protein precipitation is increased in the presence of sodium chloride in an amount greater than an ionic strength of about 0.002 (0.02% by weight) and that the amount of polysaccharide precipitation does not excessively increase until the ionic strength of sodium chloride exceeds about 0.02 (2% by weight).

The amount of protein precipitation remarkably decreases when the amount of sodium chloride exceeds the ionic strength of about 0.2, so that the maximum concentration of sodium chloride may be limited to an ionic strength of about 0.2.

Figure 2:
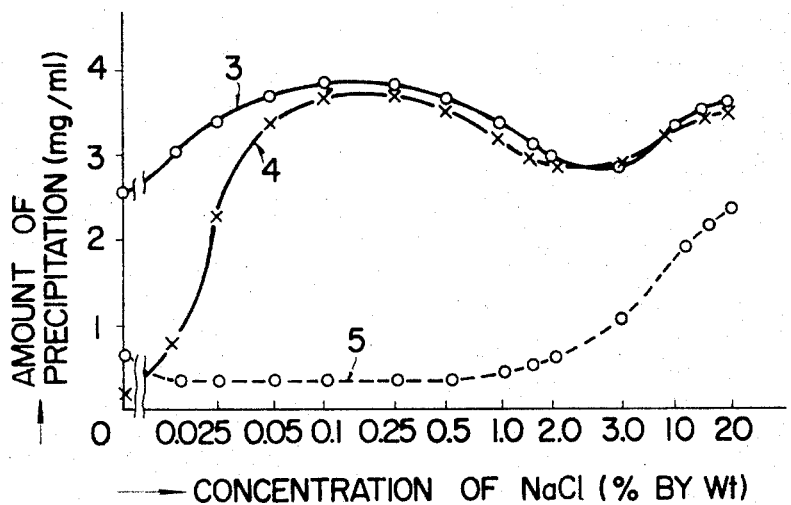

In FIG. 2, curves 3 and 4 show the amounts of protein precipitation at the time of isoelectric point precipitation and curve 5 shows the amount of polysaccharides. The result shown by curve 3 is the result of isoelectric point precipitation conducted at the optimum pH value (3.5) and curve 4 shows the result of precipitation at the pH value of 4.0.

As apparent from the results shown by curve 4, the precipitation of proteins can be improved by the presence of the proper amount of sodium chloride even when the isoelectric point precipitation is performed at the non-optimum pH value.

Figure 3:
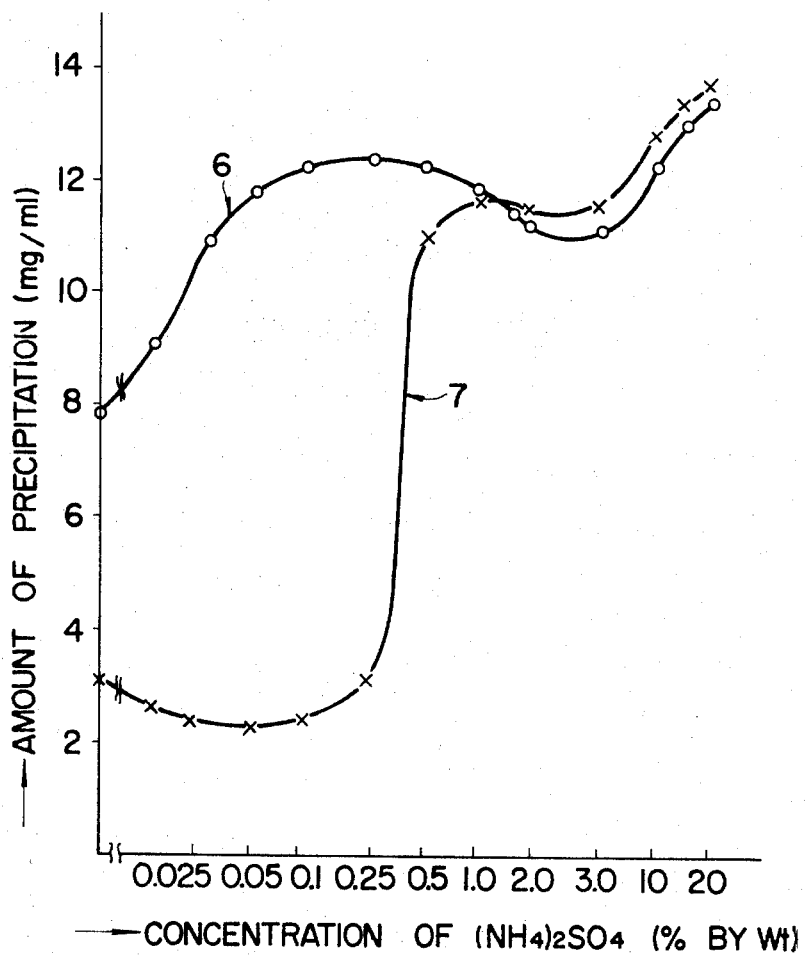

In FIG. 3, curve 6 shows the results of precipitation conducted at the pH value of 4.0 (the optimum pH value), and curve 7 shows the results of precipitation conducted at the pH value of 3.5 (not the optimum value). *Candida lipolitica* was used in this example. The amount of proteins precipitated is small even with the amount of salt (ammonium sulfate) being larger than 0.002 by ionic strength (about 0.1% by weight), when the pH value is not optimum; by increasing the amount of salt, the amount of protein precipitation can be remarkably increased.

The investigations of the present inventors have proved that the ionic strength ranging between about 0.005 to about 0.1 is preferable for increasing the amount of precipitation without increasing the amount of polysaccharides.

The following examples are shown to further explain the present invention and are not intended to limit the scope of the present invention.

EXAMPLE 1

One kilogram of various kinds of yeasts and bacteria shown below in Table 1 were suspended in 19 liters of a 3.5% sodium hydroxide solution, and the suspensions were stirred at 35° C. for 4 hours to extract proteins. Insoluble substances were removed by centrifugation. The resulting supernatants were neutralized to be slightly alkaline with hydrochloric acid. The neutralized extracts were subjected to gel filteration using a column packed with Sepadex G-25, which is particulate cross-linked dextran, to desalt and remove low molecular weight substances. The sodium chloride produced by neutralization of the extract was found to be substantially nil.

Seven kinds of salts shown in Table 1 were added to the resulting extract solutions in amounts shown and thereafter the pH values of the solutions containing salts were adjusted by adding hydrochloric acid to the respective isoelectric points (*Candida lipolitica*, pH 4.25; *Torulopsis sp*, pH 3.0; *Saccharomyces cervisiol*, pH 4.5; and *Escherichia coli*, pH 4.9) thereby to produce protein precipitations. The proteins precipitated aggregated to grow in size so that the precipitates could be separated easily from the mother liquids. The protein precipitates were washed, collected and dried to produce a white, tasteless, odorless and highly purified protein powder with good digestability.

TABLE 1

| Microbial cells | Salt added | Concentration of salt, percent by wt. | Purity of protein, percent | Content of polysaccharides, percent | Yield of proteins, g. | Recovery rate of proteins, percent |
|---|---|---|---|---|---|---|
| *Candida lipolitica* | | | 90 | 8.8 | 204 | 40 |
| Do | Sodium chloride | 0.02 | 92 | 7.0 | 360 | 70 |
| Do | do | 0.20 | 93 | 6.5 | 376 | 73 |
| Do | Potassium citrate | 0.20 | 91 | 6.6 | 380 | 73 |
| *Torulopsis sp* | Sodium chloride | 0.10 | 90 | 8.0 | 225 | 73 |
| Do | Sodium sulfate | 0.10 | 91 | 8.0 | 231 | 75 |
| Do | Sodium nitrate | 0.10 | 90 | 8.6 | 226 | 73 |
| Do | Ammonium sulfate | 0.10 | 92 | 7.2 | 222 | 72 |
| *Saccharomyces cerevisiae* | Sodium chloride | 0.025 | 92 | 7.0 | 250 | 75 |
| *Escherichia coli* | do | 0.025 | 95 | 3.5 | 429 | 72 |
| *Torulopsis sp* | Ammonium citrate | 0.1 | 90 | 8.5 | 220 | 71 |

EXAMPLE 2

One kilogram of dried *Candida lipolitica* was suspended in 20 liters of 3.5% sodium hydroxide solution, and the suspension was stirred at 35° C. for 4 hours to extract proteins. The resulting extract solution was separated by centrifugation from a slurry.

The extract was charged in a tube of cellulose acetate and both ends of the tube were closed to carry out dialysis against water. When the alkali concentration reached 0.02 N, hydrogen chloride was added to the extract discharged from the tube to adjust the pH value to 4.25. The proteins precipitated were collected by centrifugation and were washed once with water followed by drying to produce 368 grams of a white, tasteless and odorless protein. The proteins obtained had a purity of 94%, and were effectively digested by pepsin and tripsin and their digestion efficiency was comparable with that of milk casein. As the protein content of the raw yeast was 52%, 67% of proteins could be recovered.

EXAMPLE 3

One kilogram of dried *Candida lipolitica* was subjected to the same separation procedure as in Example 2 to produce an extract containing sodium hydroxide as an extracting agent. To the resulting extract added was 360 millilitres of strong ion-exchange resin particles (Amberlite, H+ type, a product of Rohm & Haas Co., U.S.A.) in order to carry out dealkalination until the alkali concentration reaches 0.02 N. After such alkali removal, the ion-exchange resin was separated from the extract and hydrochloric acid was added to the resulting extract to adjust the pH value of 4.25.

The proteins precipitated were collected by centrifugation, washed by water, and dried to produce 340 grams of a white, tasteless and odorless protein powder having a purity of 92%. The thus obtained proteins could be digested by pepsin and tripsin as in the case of milk casein. As the protein content of the raw yeast used was 52%, 60% of proteins could be recovered.

EXAMPLE 4

One kilogram of each of different yeasts and bacteria shown below in Table 2 was suspended in 4 liters of 0.4 N dilute hydrochloric acid solution. Each suspension was heated at 100° C. with stirring for 20 minutes to pretreat the microbial cells. After this pretreatment a sodium hydroxide solution was added to the suspension in order to neutralize and further adjust the alkali concentration to 0.5 N. The resulting solution concentrated to a 5% yeast concentration was stirred at 35° C. for 1 or 2 hours to perform an alkali extraction. After the slurry in the solution was removed by centrifugation from an extract, hydrochloric acid was added to the extract to adjust the pH value to 8 to 9 and this extract was subjected to gel filtration using a column packed with the gel filtering material Sephadex D-25 in order to carry out desalting and removal of low molecular weight substances. In this gel filtration, a high molecular weight fraction containing proteins flowed out first from the column and, subsequently, a low molecular weight fraction containing a salt (NaCl) and low molecular weight substances flowed therefrom. Separation of the high molecular weight fraction from the low molecular weight fraction was carried out by operating a valve provided at the bottom of a gel filtration apparatus.

As shown in Table 2, different kinds of protein solutions in which concentrations of sodium chloride remaining in the solutions were changed from 0.001 to 1% by weight were prepared. To each of these different solutions was added hydrochloric acid so as to adjust the pH value to the isoelectric point peculiar to the proteins (these pH values are the same as noted in Example 1 except for *Saccharomyces carlsbergensis* with a pH of 4.4).

The proteins precipitated were separated from a supernatant, washed by water and dried to produce a white, tasteless and odorless protein powder in amount as shown in aTble 2. All of the proteins showed the digestabilities comparable with that of milk casein in the artificial digestion tests using pepsin and tripsin.

As apparent from the results shown in Table 2, it is preferable to control the sodium chloride concentration to about 0.02 to 0.1% by weight ($\mu$=0.002 to 0.1) so that the yield rate of protein can be remarkably improved.

TABLE 2

| Microbial cells | | Amount of residual sodium chloride, percent by weight | Purified protein | | |
|---|---|---|---|---|---|
| Name | Protein content, percent | | Yield, g. | Purity, percent | Yield rate of protein, percent |
| Candida lipolitica | 52 | >0.001 | 245 | 92 | 43 |
| | | 0.02 | 400 | 91 | 70 |
| | | 0.10 | 410 | 91 | 72 |
| | | 0.50 | 398 | 90 | 69 |
| Torulopsis sp. | 28 | >0.001 | 279 | 90 | 38 |
| | | 0.02 | 217 | 93 | 72 |
| | | 0.10 | 222 | 92 | 73 |
| | | 1.0 | 206 | 92 | 68 |
| Saccharomyces carlsbergensis | 31 | >0.001 | 109 | 91 | 32 |
| | | 0.02 | 227 | 93 | 68 |
| | | 0.10 | 248 | 93 | 74 |
| | | 0.50 | 206 | 93 | 62 |
| Escherichia coli | 57 | >0.001 | 159 | 90 | 25 |
| | | 0.02 | 370 | 91 | 59 |
| | | 0.10 | 376 | 91 | 60 |
| | | 0.50 | 372 | 92 | 60 |

EXAMPLE 5

Dried *Candida lipolitica* (50 grams) was suspended in 1000 milliliters of 3.5% sodium hydroxide, and the suspension was stirred at 35° C. for 3 hours to extract proteins. The slurry was separated by centrifugation from the extract. 360 milliliters of strongly acidic sulfone type cation-exchange resin (Amberlite IR-120B produced by Rohm & Haas Co. in U.S.A.) was added to 900 milliliters of the extract. The mixture was strongly stirred at a room temperature for 5 minutes to carry out dealkalization until the pH value of the mixture reaches 9.0 to 10.0. A supernatant was collected by decantation and the resin was washed twice with 540 milliliters of water to collect a residual liquid in the resin. A small amount of concentrated hydrochloric acid was added to the supernatant and the residual liquid so as to adjust the pH value to 4.2. By this pH adjustment, 0.17% of sodium chloride was formed in the solution. The proteins precipitated at the isoelectric point were separated by decantation and centrifugation from a supernatant. The protein separated were washed by acetone and ether and dried to produce 9.1 g. (yield rate of recovery 60.7%) of a purified protein powder having a purity of 92%.

EXAMPLE 6

In this example 360 milliliters of weakly acidic type cation-exchange resin (Amberlite IRC-50 produced by Rohm & Has Co.) was added to 900 milliliters of an extract prepared by the same manner as in Example 5. The mixture was strongly stirred at room temperature for 30 minutes to carry out dealkalization so that the pH value of the mixture was adjusted to 8.0 to 9.0. The amount of sodium chloride formed was 0.19%. The isoelectric point precipitation, centrifugation, washing and drying were conducted in the same manner as in Example 5 to produce 9.8 grains (yield rate of recovery 65.3%) of purified proteins having a purity of 92%.

EXAMPLE 7

Frozen raw bread yeast (150 grams) with a yeast content of 30% was added to 900 milliliters of 3.5% sodium hydroxide solution, and this mixture was stirred at 35° C. for 3 hours to extract proteins. The slurry was separated by centrifugation from the extract. The resulting 900 milliliters of the extract were subjected to the procedures of dealkalization, isoelectric point precipitation, washing and drying so that 7.8 grams (yield rate recovery 60%) of desired proteins having a purity of 90% were obtained. An amount of sodium chloride was 0.3% at the time of isoelectric point precipitation.

EXAMPLE 8

Dried *Candida lipolitica* (50 grams) was added to 1000 milliliters of 0.2 N sulfuric acid solution, and the mixture was stirred at 100° C. for one hour to carry out extraction with the acid. The slurry was separated by centrifugation from the liquid extract. To 900 milliliters of the extract were added 270 milliliters of a strongly basic anion-exchange resin (Amberlite IRA-400), and the mixture was vigorously stirred at room temperature for 5 minutes to carry out acid removed so that the pH value of the mixture became 3 to 4.

A supernatant was collected by decantation and a liquid residual in the resin was collected by washing the resin twice with 400 milliliters of water.

A concentrated sodium hydroxide solution was added to the supernatant and the residual liquid so as to adjust the pH value to the isoelectric point (pH 6). A concentration of 0.17% of sodium chloride was produced in the solution. The proteins precipitated were collected by centrifugation and washed with acetone and ethanol and dried, and then 3.1 grams (yield rate 20.7%) of proteins having a purity of 90% was obtained.

Although, in case of acid extraction the yield of recovery (i.e. yield rate) tends to be lower as compared with that of alkali extraction, the yield can be increased by combining the acid extraction with a subsequent alkali extraction.

EXAMPLE 9

Dried *Candida lipolitica* (50 grams) was added to 1000 milliliters of 1 N citric acid, and the mixture was stirred at 100° C. for one hour to carry out acid extraction. The extract solution was then subjected to the same procedures as in Example 7 to produce 9.8 grams (yield rate 65.3%) of proteins having a purity of 82% was produced. The amount of sodium chloride in the solution at the time of isoelectric point precipitation was 0.3%.

It will be observed from the foregoing examples that the function of the added salt depends on its effective ionic strength and that the ionic strength must be from about 0.002 to about 0.2 in order to provide the improved yields of protein recovery.

While the novel principles of the invention have been described, it will be understood that various omissions, modifications and changes in these principles may be made by one skilled in the art without departing from the spirit and scope of the invention.

What is claimed is:

1. A method of recovering proteins from microbial cells comprising the steps of preparing an extract solution containing proteins extracted from microbial cells selected from the group consisting of bacteria, yeasts, fungi, algae and protozoa, and separating said proteins by isoelectric point precipitation from said extract solution, the improvement wherein said isoelectric point precipitation is performed in the presence of a water soluble salt selected from the group conssting of alkali metal salts and ammonium salts in an amount of from about 0.002 to about 0.2 by ionic strength whereby the proteins precipitated aggregate to grow in size and the proteins are easily separated from said extract solution.

2. The method of claim 1, wherein the ionic strength of said water soluble salt is preferably between about 0.005 and 0.1.

3. The method of claim 1, wherein the alkali metal salts include halides, sulfates, nitrates, and citrates and said ammonium salts include sulfates, nitrates, acetate, citrate, and oxalates.

4. A method of recovering proteins from microbial cells comprising:
   (1) subjecting microbial cells selected from the group consisting of bacteria, yeast, fungi, algae and protozoa to an extraction process to obtain an extract containing proteins;
   (2) separating insoluble substances from the extract;
   (3) effecting neutralization of said extract;
   (4) separating a salt formed by neutralization and low molecular weight substances from said neutralized extract;
   (5) subjecting the extract to isoelectric point precipitation so as to precipitate proteins; and
   (6) separating proteins precipitated from said extract, wherein said isoelectric point precipitation is performed in the presence of a salt selected from the group consisting of alkali metal salts and ammonium salts in an ionic strength of from about 0.002 to about 0.2 whereby proteins precipitated aggregate to grow in size.

5. A method of recovering proteins from microbial cells comprising:
   (1) subjecting microbial cells selected from the group consisting of bacteria, yeasts, fungi, algae and protozoa to an extraction treatment thereby to produce an extract containing proteins;
   (2) separating insoluble substances from said extract;
   (3) effecting neutralization of said extract;
   (4) separating the resulting salt formed by said neutralization and the low molecular weight substances from said extract;
   (5) adding a salt selected from the group consisting of alkali metal salts and ammonium salts in such an amount as to give an ionic strength ranging from about 0.002 to about 0.2 when the salt added is dissolved;
   (6) adjusting the pH value of said extract to the isoelectric point of the proteins contained in said extract thereby to effect isoelectric point precipitation of said proteins; and
   (7) separating the proteins precipitated from said extract.

6. A method of recovering proteins from microbial cells comprising:
   (1) subjecting microbial cells selected from the group consisting of bacteria, yeasts, fungi, algae and protozoa to alkali extraction;
   (2) separating insoluble substances from the resulting extract;
   (3) reducing the amount of alkali in the extraction which is used in the extraction until the concentration of alkali becomes about 0.003 to about 0.09 N;
   (4) adjusting the pH value of the extract by adding an acid to an isoelectric point of the proteins in the extract thereby to form a salt selected from the group consisting of alkali metal salts and ammonium salts in an amount of 0.002 to 0.2 by ionic strength, whereby the proteins are precipitated from said extract and aggregate to grow in size; and
   (5) separating said proteins precipitated from said extract.

7. The method of claim 6, wherein the separation of the insoluble substances is subsequent to the reduction of the amount of alkali.

8. A method of recovering proteins from microbial cells comprising:
   (1) subjecting microbial cells selected from the group consisting of bacteria, yeasts, fungi, algae and protozoa to acid extraction;
   (2) separating insoluble substances from an extract;
   (3) reducing the amount of acid in the extract which is used in the acid extraction until the concentration of acid becomes from about 0.003 to about 0.09 N;
   (4) adjusting the pH value by adding an alkali to an isoelectric point of the proteins in the extract thereby to form a salt selected from the group consisting of alkali metal salts and ammonium salts in an ionic strength from about 0.002 to about 0.2 whereby the proteins are precipitated from said extract and aggregate to grow in size; and
   (5) separating the proteins precipitated from said extract.

9. The method of claim 8, wherein the separation of said insoluble substances is subsequent to the reduction of the amount of acid.

10. A method of recovering proteins from microbial cells comprising:
(1) subjecting microbial cells selected from the group consisting of bacteria, yeasts, fungi, algae and protozoa to an acid or alkali extraction;
(2) separating insoluble substances from the resulting extract;
(3) effecting a neutralization of the extract to form a water soluble salt selected from the group consisting of alkali metal salts and ammonium salts;
(4) reducing the amount of said salt formed until the concentration of the salt provides an ionic strength of from about 0.002 to about 0.2 by ionic strength at the time of isoelectric point precipitation;
(5) adjusting the pH value of the extract to the isoelectric point of the proteins, so that proteins are precipitated and aggregate to grow in size; and
(6) separating the proteins precipitated from the extract.

11. The method of claim 8, wherein the separation of insoluble substances is subsequent to said neutralization.

12. The method of claim 11, wherein said extraction is effected by using a sodium hydroxide solution.

13. The method of claim 8, wherein the reduction of the salt is effected by gel filtration.

14. The method of claim 8, wherein the salt added is sodium chloride.

References Cited
UNITED STATES PATENTS 2,603,630   7/1952   Aries _____ 260—112

LIONEL M. SHAPIRO, Examiner

R. B. PENLAND, Assistant Examiner

U.S. Cl. X.R.

260—112 R; 195—28 R